Aug. 17, 1948.    D. SILVERMAN    2,447,098
SIGNALING SYSTEM

Filed June 28, 1943    4 Sheets-Sheet 1

Inventor:
Daniel Silverman
By: Paul F. Hawley
Patent Agent

Aug. 17, 1948.    D. SILVERMAN    2,447,098
SIGNALING SYSTEM
Filed June 28, 1943    4 Sheets-Sheet 3
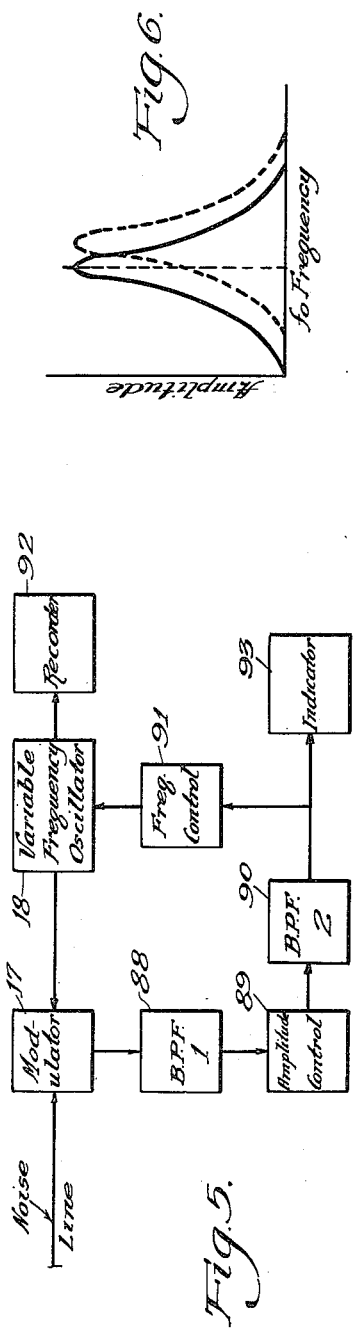
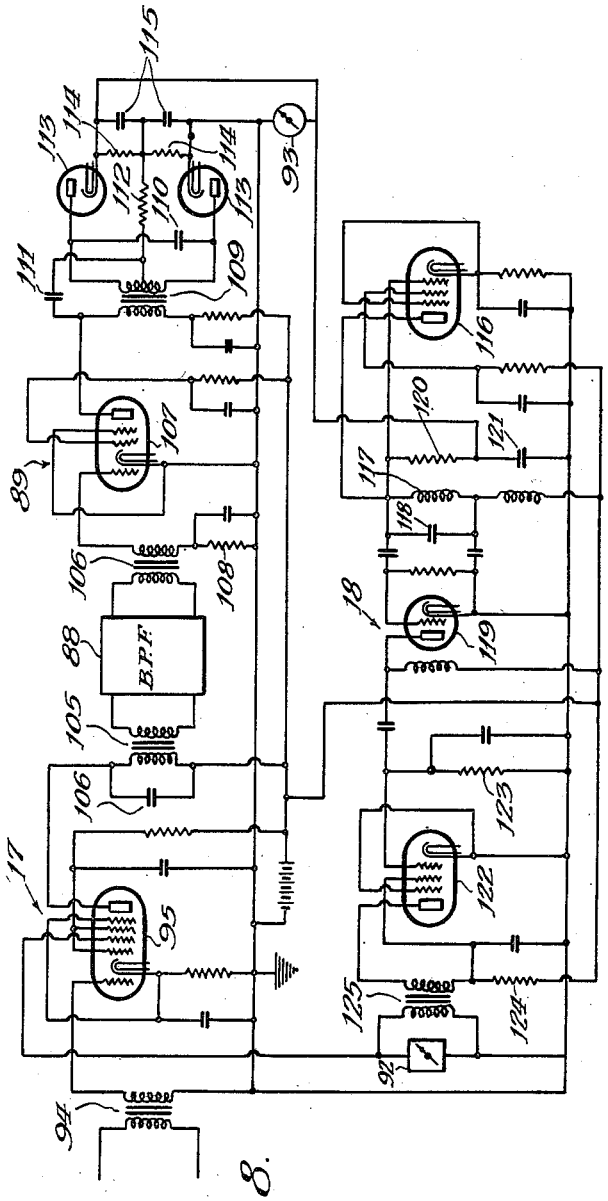
Inventor:
Daniel Silverman
By: Paul F Hawley
Patent Agent Aug. 17, 1948.   D. SILVERMAN   2,447,098
SIGNALING SYSTEM Filed June 28, 1943   4 Sheets-Sheet 4

Inventor:
Daniel Silverman
By: Paul F Hawley
Patent Agent

Patented Aug. 17, 1948

2,447,098

UNITED STATES PATENT OFFICE 2,447,098

SIGNALING SYSTEM

Daniel Silverman, Tulsa, Okla., assignor to Stanolind Oil and Gas Company, Tulsa, Okla., a corporation of Delaware Application June 28, 1943, Serial No. 492,491

1 Claim. (Cl. 250—36)

This invention pertains broadly to the art of electric signalling and has particular application in the field of telemetering including well logging.

In many types of signalling systems such as the ordinary communication systems now in use, the effect of the transmission medium is of relatively little importance. If there is large attenuation the amplitude can be increased at convenient points or a more sensitive receiver can be employed. However, in certain types of signalling systems the transmission medium is subject to large and variable attenuations. Accordingly in such systems it is nearly impossible to secure satisfactory quantitative results, particularly when employing telemetering. By telemetering is meant the measurement of a quantity, translating this measurement into an electrical signal, and receiving at least a portion of this signal at some distant point for measurement. Obviously if there is a variable attenuation in the transmission medium it is difficult to interpret the received signal in terms of the amplitude of the transmitted signal. I am aware that in such cases recourse has been made to a frequency modulation system in which the original measurement is translated into a variation in frequency of the transmitted signals, there being a direct relationship between this variation in frequency and the quantity being measured. In such cases the amplitude of the signal received is of no essential importance provided only that it is great enough to be detected. The quantity being measured is detected in terms of the change in frequency of the signal.

However, one practical limitation of a frequency modulated telemetering system lies in the fact that it is necessary to calibrate the oscillator used in the transmitter in order to determine how much of the observed change in frequency is due to the quantity being measured and how much is actually due to drift in the frequency of the oscillator due to change in the various quantities of the circuit elements or of the potentials applied to the oscillator. There is another limitation in frequency modulated telemetering systems in those applications in which electrical noise or interference occurs between the transmitter and receiver or in the receiver itself. The energy in these spurious electric signals is a function of the width of the band of frequencies being received. If the signal is weak it is necessary to limit the band of width being received to as small a value as possible in order to get the highest value of signal to noise ratio. Unless a high signal to noise ratio is obtained, no measurement can be made at the receiver since it will respond to the noise rather than to the signal. However, in the frequency modulation type of system a band of frequencies of considerable width is necessary in order to permit transmission of a considerable variation in the quantity being measured. This condition is contradictory to the requirement for high signal to noise ratio.

It is an object of this invention to provide a method and means by which the band width at the receiver can be extremely narrow while still permitting a wide variation in frequency for the transmission of the metering signals. It is a particular object of this invention to provide a means of maintaining a first alternating current electric signal at a predetermined constant difference in frequency from a second alternating current signal, the frequency of which varies. Another object of this invention is to provide such a system in which a visual indication is produced proportional to the frequency of the controlled electric signal. Still a further object of this invention is to provide means for sharply filtering the difference in frequency between a transmitted signal and a signal generated by a local oscillator and utilizing the output of the sharp filtered waves to control the frequency of the local oscillator. Further objects and advantages of this invention will be apparent from this specification.

In general this receiving system for frequency modulated waves, particularly those in which the transmitted frequency is varied in accordance with a measurement made at a distant point, involves the use of a very low frequency sharply tuned filter to discriminate against noise. This filter operates on the output of a modulator or heterodyne detector that mixes the received signal plus noise and the output of a variable frequency oscillator. The output of this low frequency filter controls means for changing the frequency of the variable frequency oscillator in accordance with the amplitude of the output of the filter, in order to keep the frequency of the modulated signals fed into the filter constant in frequency. By this means the variable frequency oscillator produces a signal which is maintained at a constant difference in frequency from the transmitted frequency, this difference being the frequency of the filter.

In order to describe this invention in greater particularity certain figures have been attached hereto and are to be read in conjunction with this specification. In these figures the same reference numeral in different figures refers to the same or a corresponding part.

Figure 5 represents in block diagram form a third embodiment of the invention;

Figure 6 is a graph of signal-frequency relationships;

Figures 7 and 8 are schematic diagrams of apparatus for performing the functions set out in Figure 5.

Figure 1:
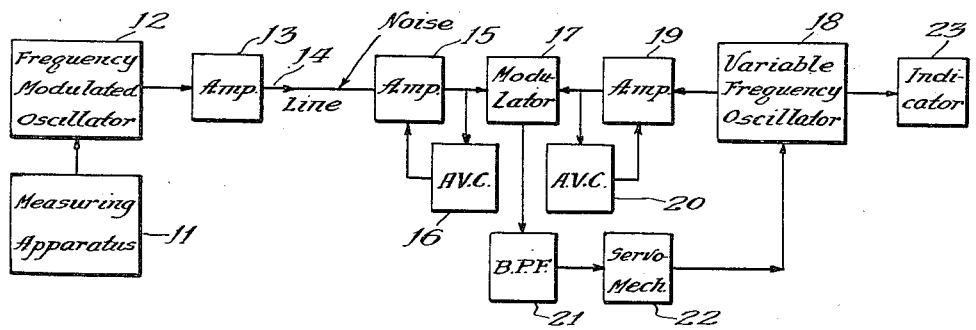
Figure 1 represents in block diagram form the various elements used in generating and receiving the signals in one embodiment of my invention.

Referring now to Figure 1, a measuring apparatus 11 which can be any of the systems already known in the art for producing an electric signal in proportion to a quantity being measured, is connected to a frequency modulated oscillator 12, the frequency of which is controlled by the output of this measuring apparatus 11. Preferably the output of this frequency modulated oscillator is amplified, for example by an amplifier 13, the output of which is impressed upon a transmission medium or transmitting line 14. Electrical disturbances or noise are impressed on this transmission medium. Such electric noise may involve the well known phenomenon identified as static or it may involve ground currents in the case of well logging, etc. In all events a portion of the transmitted signal is received at a receiver along with a certain quantity of this electrical noise. The input to the receiver is amplified by an amplifier 15. This amplifier may and preferably does include a resonant circuit or a filter which is broadly tuned to the range of frequencies to be expected from the frequency modulated oscillator 12 and which thereby serves to attenuate electrical noise lying outside of this range of frequencies. However, this filter does not remove the main disturbing elements in the noise spectrum, i. e., those lying within the range of frequency of the oscillator 12. The output of amplifier 15 is maintained at substantially constant amplitude by a volume control means which may, for example, be a limiter or an automatic volume control system 16. The relatively constant output from amplifier 15 is impressed on a modulator or heterodyne detector 17. A variable frequency oscillator 18 is included in the receiver. The output of this oscillator is brought to a relatively constant amplitude, for example by passing it through an amplifier 19 which is controlled by an amplitude limiter or automatic volume control system 20. It is apparent that the transmitted signals plus noise are mixed with the output of the variable frequency oscillator in the modulator or heterodyne detector 17. The output from this modulator 17 contains various waves including an alternating current wave at the difference of frequency of the received signals and the frequency of the variable oscillator 18. The output of this modulator or heterodyne detector 17 is sharply filtered at a predetermined constant low frequency by a band pass filter 21. The output from the band pass filter varies in amplitude depending upon the difference frequency between the input waves as compared to the peak frequency for which this filter is tuned. If this difference frequency is exactly equal to the peak frequency, the output of filter 21 will be a maximum and since the filter is sharply tuned, the amplitude of the filtered output will drop off rapidly and vary approximately linearly as the difference frequency diverges from the peak frequency of the filter. It is to be noted that the sharply tuned band pass filter rejects components at all frequencies which are not very close to the peak frequency so that the waves in the output of the modulator which are proportional to the difference in the frequency of the noise and the frequency of the variable oscillator are very highly attenuated.

The output of the band pass filter 21 actuates a servo-mechanism 22. As is well known, a servo-mechanism is a device which produces motion in response to an electric signal, the amount of the motion being dependent upon the amplitude of the applied signal and there being one point at which for a certain applied signal intensity there is no motion at all. For example, see "Design and Test of a High Performance Servo Mechanism," by H. L. Hazen, Journal of the Franklin Institute, vol. 218, pp. 543–580, November, 1934. This servo-mechanism 22 is employed to control or adjust the frequency of the variable frequency oscillator 18 by varying an electric circuit element in the resonant circuit of the oscillator. Accordingly the frequency of the oscillator is maintained at such a point that the output of the band pass filter 21 remains substantially constant. Whenever the frequency of the transmitted signal varies, the difference frequency likewise varies, the output from the band filter changes in amplitude and the servo-mechanism 22 immediately changes the frequency of oscillator 18 until this difference frequency again becomes the value at which the output of the band pass filter 21 does not actuate the servo-mechanism, or, in other words, the oscillator frequency is controlled as a function of the amplitude of the filtered waves. The control system therefore maintains the signal frequency from the variable frequency oscillator at a predetermined constant difference in frequency from that of the received signal. Since the band pass filter is tuned to a low frequency which should be less than 100 cycles per second and preferably below 20 cycles per second, for example 1 to 12 cycles per second, and may be an electro-mechanical system of high effective "Q," it is apparent that if the variation in frequency of oscillator 12 is of several hundred or thousand cycles per second, in effect the variable frequency oscillator is synchronized to oscillate at a frequency very close to that of the oscillator 12 and that thereby the variation in frequency of oscillator 18 is directly related to the signals put out by the measuring apparatus 11. A visual indication is made which is proportional to the variation in frequency of the signals from oscillator 18, for example by indicator or recorder 23. This indicator may, for example, be a frequency meter or may be an indicator of the amount of variation of the electric circuit element in the resonant circuit of filter 18 caused by operation of servo-mechanism 22. Still other examples of methods of coupling this indicator to the system will be shown in the following figures.

Figure 2:
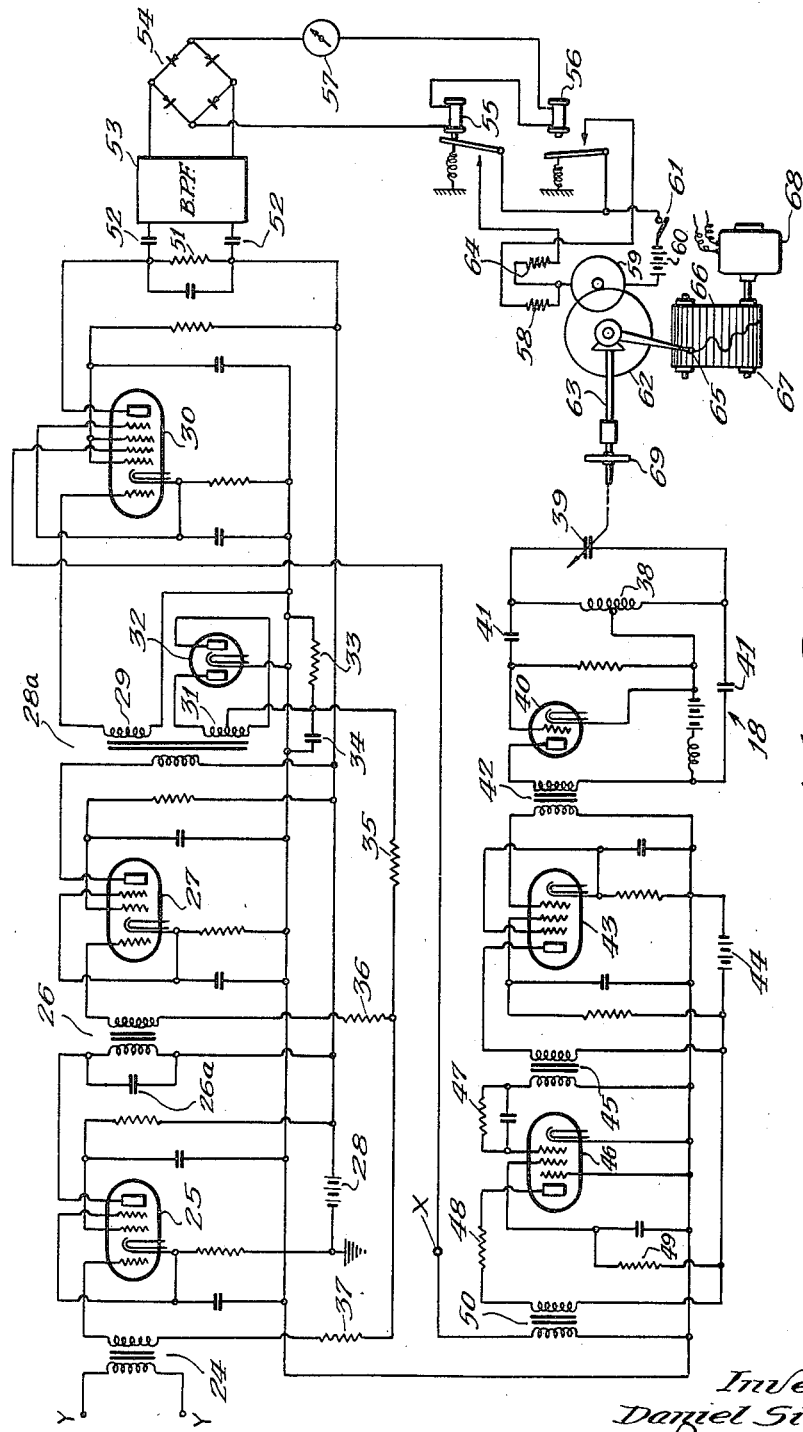
Figure 2 is a schematic diagram of apparatus used at a point of reception for the frequency modulated waves to carry out the functions shown in Figure 1.

In Figure 2 is shown a schematic wiring diagram of one arrangement of apparatus for carrying out the functions indicated in Figure 1. The incoming signal plus noise is impressed across the terminals Y—Y of the primary of a transformer 24, the secondary of which is connected to the grid of a first amplifying tube 25. The output from this tube is impressed upon the primary of transformer 26 across which is connected a condenser 26a by means of which the plate circuit of tube 25 is broadly resonant in the range of frequencies to be expected from the frequency modulated transmitter and which thereupon reduces to some extent the amplified noise in the receiver. The output from transformer 26 is again amplified by amplifier tube 27. Amplifier tubes 25 and 27 are supplied with plate potential from a source such as battery 28 and are supplied with filament power from a source (not shown) in a manner obvious to those acquainted with vacuum tubes. Suitable bias circuits are supplied for these tubes in the conventional manner. The output of the second amplifier is impressed on transformer 28a. The secondary of this transformer impresses the amplified signal upon the control grid of a pentagrid mixer tube 30. A center tapped tertiary winding 31 impresses a signal proportional to the amplified output from vacuum tube 27 on a double diode rectifier tube 32 producing a rectified output, the amplitude of which is proportional to the amplitude of the signals on winding 31, across a resistor 33. This voltage is filtered by condenser 34 and resistors 35, 36 and 37 and is applied to the control grids of vacuum tubes 25 and 27 through the secondaries of transformers 24 and 26 to adjust the gain of these two amplifier stages. Winding 31, rectifier 32 and the associated apparatus constitutes an automatic volume control system of a known type which operates to maintain the output from the two amplifier tubes at a substantial constant maximum amplitude.

The variable frequency oscillator 18 shown in Figure 2 is a simple Hartley oscillator with a resonant circuit consisting of inductance 38 and variable tuning condenser 39. This resonant circuit is coupled to the oscillator tube 40 through condensers 41 so that the output from the oscillator on transformer 42 is substantially a sine wave the frequency of which depends upon the setting of condenser 39. The output from this oscillator is amplified by vacuum tube 43 which is energized by a source of potential such as battery 44. The amplified output of tube 43 appears across transformer 45. While exactly the same system of volume control employed to maintain a constant output from amplifier tubes 25 and 27 could be used to secure a constant output from vacuum tube 43, it is equally satisfactory to employ a limiter circuit including vacuum tube 46. The cathode of this pentode is connected directly to ground and the control grid is connected to ground through the secondary of transformer 45 in series with a resistor 47. Thus grid current flows as soon as the signal is applied and produces a bias that increases with the magnitude of the applied signal. This action is emphasized by operating the plate and screen grid of this pentode at a relatively low potential which is obtained by the use of dropping resistors 48 and 49. The increased signal decreases the gain of the tube and so maintains a substantially constant output voltage for any signal in excess of a given minimum. The amplifier tube 43 insures that this given minimum is always exceeded. There is slight amplitude distortion which is not objectionable in this application. The output from this limiter stage appears across the secondary of transformer 50 as a substantially constant output signal the frequency of which depends upon the capacity of tuning condenser 39. This signal is applied to the third grid of the pentagrid mixer tube 30. The output from this mixer tube includes various waves of which one wave is produced by the heterodyning of the signal frequency of the input signal from the oscillator 12 with that from the local oscillator 18. If the frequencies of these two signals are fairly close together this difference frequency will be a very low audio frequency. In order to segregate this difference frequency from those due to the action of noise, the output from the mixer across resistor 51 is coupled by condensers 52 to a very low frequency band pass filter 53. The characteristics of this band pass filter are shown in Figure 6 in a solid line, in which it is seen that the amplitude of output for a constant amplitude input decreases sharply on each side of the peak frequency $f_0$. I have found by the employment of a very low frequency band pass filter, for example below 20 cycles per second, I secure two distinct advantages in the operation of this system. In the first place, I can obtain extremely sharp filtering, i. e., the width of the pass band in cycles per second becomes only a few cycles. Second, since the output of this band pass filter is used to control the frequency of the variable oscillator 18, and in effect keep it almost in synchronism with the output of the oscillator 12, if $f_0$ is very low there is very little difference between the frequencies of oscillator 12 and 18. Very low frequency sharply tuned filters suitable for this purpose may include multistage Scott circuits or more preferably an electro-mechanical filter circuit such, for example, as described in Figure 7. As described therein, one such filter was constructed at a frequency of approximately 12 cycles per second which had a pass band of approximately one cycle per second. Obviously using such a filter, the output of the filter 53 will sharply discriminate or attenuate that output of the mixer tube 30 which varies with the electrical noise.

In order to utilize the sharp filtering characteristics of the filter 53 properly, it is desirable to employ it to control the servo-mechanism about to be described. One satisfactory method of accomplishing this involves rectifying the output of the filter, for example by a full wave rectifier 54, the rectified output of which is applied to the coils of two relays 55 and 56. In order to secure a visual indication of the output of the filter, I prefer to include an indicating meter 57 in this circuit. Relays 55 and 56 are adjusted so that under normal operating conditions the armature of relay 55 is closed against the action of a spring while the armature of relay 56 is held open by the action of another spring. An increase in output of the filter secured when the difference frequency applied to the input of this filter comes closer to the resonant frequency $f_0$, closes relay 56 whereas swinging the difference frequency away from $f_0$ will result in the release not only of relay 56 but also of relay 55. When relay 56 closes it closes a circuit through a field winding 58 of a small series motor 59 through the armature and the source of power which is shown as battery 60. Switch 61 is, of course, closed at this time. The closing of this relay thereupon rotates the direct current motor which is connected through gear train 62 to rotate a shaft 63 which in turn varies the setting of variable condenser 39. This variation changes the frequency of oscillator 18 which changes the difference frequency applied to the band pass filter 53 in such a sense as to increase the difference frequency, thus decreasing the output of the rectifier 54 and causing relay 56 to open, thus shutting off motor 59.

If this difference frequency becomes greater than normal, the output from band pass filter 53 decreases, thus causing the armature of relay 55 to open, closing the switch contacts of this relay through the second winding 64 of motor 59. This winding is wound in opposition to the field coil 58 and thus causes the motor to rotate in the reverse direction, again adjusting condenser 39 which in turn adjusts the difference frequency from the mixer tube 30 to the value at which relay 55 again closes.

The position of shaft 63 is indicative of the frequency of oscillator 18. Accordingly, a visual indication proportional to the relative motion of this shaft indicates the variation in frequency of oscillator 18 and in turn indicates the variation in frequency of the transmitting oscillator 12. A stylus 65 is mounted to rotate with a gear of gear train 62 and is pressed against a strip of paper or similar material 66 which is rolled onto a drum 67, for example by an electric motor 68. Thus the motion of the stylus on the paper produces a record directly related to the variation in frequency of oscillator 18. The paper strip or chart 66 may be moved longitudinally with respect to the stylus in any desired fashion. For example, in well logging this strip would be normally moved in direct relationship to the lowering of the measuring apparatus 11 into the well in a manner which has been previously described in the art. If, on the other hand, a variation of frequency as a function of time is desired, the leads to motor 68 can be connected to any constant frequency source by means of which strip 66 will be moved at a substantially constant speed.

In case of necessity it is possible to eliminate the servo-mechanism. Thus, for example, by opening switch 61 the motor 59 is deenergized. Shaft 63 is provided with a hand wheel 69 which can be manually operated to vary the capacity of condenser 39. In this case the operator watches the meter needle on meter 57, keeping it at a constant amplitude.

Figure 3:
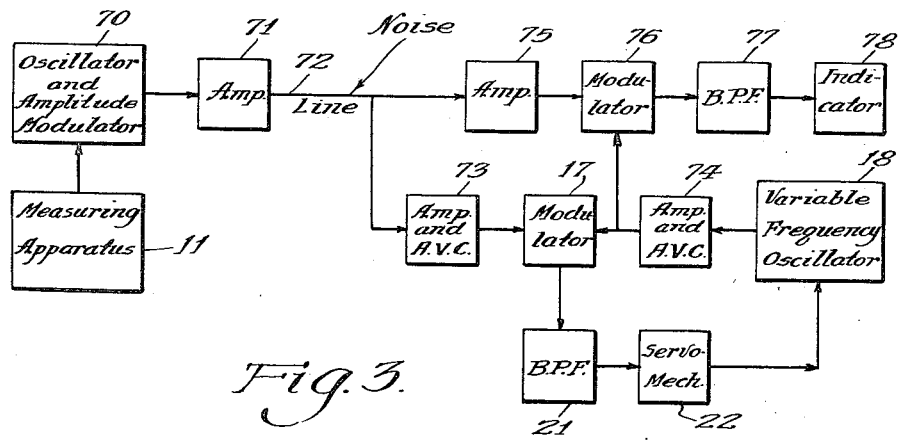
Figure 3 is a representation in block diagram form of an alternative embodiment of my invention.

It is apparent that the synchronizing features of the invention have wide application in telemetering. In case a transmitter is used which is operated at a fairly constant frequency with a variable amplitude, this invention can still be employed, as shown in Figure 3. Here the measuring apparatus 11 operates to modulate the amplitude of an oscillator and amplitude modulator 70. The output of this equipment is preferably amplified by amplifier 71 and impressed on the transmission medium or transmission line 72. As before, it is assumed that this signal is attenuated as it passes through the medium and that electrical noise is impressed thereon. A part of the received signal is passed through an amplifier and volume control 73 which produces a signal of substantially constant maximum output. This is impressed on the modulator 17, as is the signal from variable frequency oscillator 18 which has similarly been passed through an amplifier and volume control apparatus 74. The output from the modulator is sharply filtered by a low frequency band pass filter 21, the amplitude of which is utilized to actuate a servo-mechanism 22 which adjusts the frequency of the variable frequency oscillator 18. Another portion of the input signal is amplified by amplifier 75. In order to obtain an indication of the amplitude of the modulated signal it is necessary to demodulate the amplified output from amplifier 75, which can be accomplished satisfactorily by impressing this signal on a heterodyne detector or modulator 76 which is likewise fed with signals from the variable frequency oscillator 18. It is apparent that using this oscillator which has been kept at a constant difference frequency from the frequency of oscillator 70 by the servo-mechanism 22, the output from modulator 76 will be at a constant difference frequency between the frequency of the signals of amplifier 75 and those from oscillator 18 and that the amplitude of these output signals will vary with the amplitude of the signals from amplifier 75. A sharply tuned band-pass filter 77 similar to filter 21 is provided as the detector of the output from the modulator. The signals from this filter actuate the indicator 78 which produces a visual indication of the amplitude of the demodulated wave. In this case the invention has been utilized to produce perfect "tracking" between the oscillator 70 and the local oscillator 18. It is to be understood that such a system would not be necessary if there is an accurate frequency control on oscillator 70. However, in telemetering applications in well logging or logging-while-drilling operations, such control is inherently infeasible and therefore serious errors would occur if no means were available to keep the local oscillator 18 operating at a constant difference frequency from that of oscillator 70.

Figure 4:
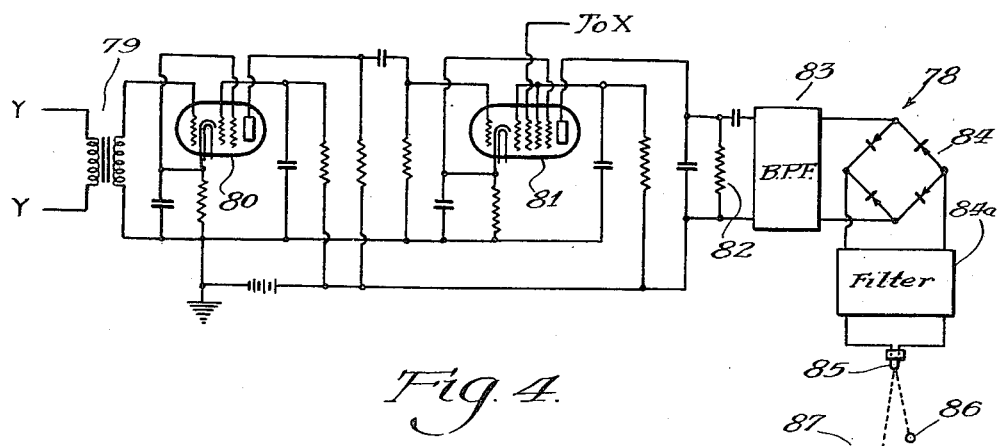
Figure 4 is a schematic diagram of apparatus used in conjunction with that of Figure 2 to carry out the alternative embodiment of my invention.

Figure 4 illustrates the additional equipment necessary to carry out the functions illustrated in Figure 3. The apparatus in Figure 2 is employed as before. Across points Y—Y in Figure 2 is connected the input to transformer 79, the secondary of which feeds the amplifier tube 80. The output of this stage is impressed through a resistance capacity coupling on the control grid of pentagrid mixer tube 81. On the third grid of this mixer tube is applied the constant amplitude alternating current signal from point X on Figure 2 which is at the output of the transformer 50. The output from the pentagrid mixer tube 81 therefore contains a component at the difference of the frequencies between the amplitude modulated signal impressed on terminals Y—Y and the frequency of the signal at point X, with an amplitude which varies in accordance with the modulation of the signal across the input to the receiver. This output across resistor 82 is filtered, preferably by a low frequency band-pass filter 83 and passed to the indicator shown generally by numeral 78. This can, for example, be made up of a full wave rectifier 84, the output of which is filtered by the low frequency filter 84a and impressed on an oscillograph element 85, which therefore oscillates in relation to the detected amplitude of the modulated wave. By means of a lamp 86 focused on the mirror of oscillograph element 85, a record is made on a moving strip of photosensitive film 87.

Another embodiment of receiving equipment in accordance with my invention is shown in Figure 5. Here the received signal plus noise at the receiving end of the transmitting medium is directly applied to a modulator or heterodyne detector 17, to which is also applied the signal from the variable frequency oscillator 18. The output of the modulator or heterodyne detector 17 is applied to a first low frequency sharply tuned band pass filter 88. The output of this filter is passed through an amplitude control 89 which brings the amplitude to a constant maximum value regardless of the frequency. The output of this amplitude control is applied to a second sharply tuned low frequency band-pass filter 90. The output of this second filter is utilized to operate a frequency control mechanism 91 which may be a servo-mechanism or may be any other type of electrical frequency control apparatus which adjusts the frequency of the variable frequency oscillator 18. The variations in frequency of oscillator 18 are applied to a recorder 92 which produces a visual indication varying in accordance with the frequency of oscillator 18. Preferably but not necessarily, an indicator 93 is connected to the output of the second band pass filter 90 in order to indicate the variation in output of this filter.

The operation of this embodiment of the invention can be considered to involve the following operations. The first band pass filter 88 sharply discriminates against all signals except those at the difference frequency corresponding to the pass band of filter 88, thus eliminating substantially all noise components. The amplitude of this signal is not constant since no amplitude control was employed on either of the signals applied to the modulator. However, the signal amplitude control 89 brings the output from the first band pass filter to a constant level. The second band pass filter 90 is tuned to a slightly different frequency from that of the first filter. The response of this filter may, for example, be shown by the dashed line in Figure 6. It is apparent, therefore, that as the constant amplitude signal from the amplitude control 89 passes through this second band pass filter that the amplitude of the output is going to vary depending upon the frequency. Any variation of this amplitude from a predetermined value actuates the frequency control 91 to change the frequency of oscillator 18 in such a sense that the output of the second band pass filter 90 tends to be maintained at a constant level. By this means the frequency of oscillator 18 is maintained at a substantially constant predetermined difference from that of the frequency modulated input from the transmission medium. This system has the advantage over that shown in Figure 1 in that only one amplitude control need be employed.

Figure 7:
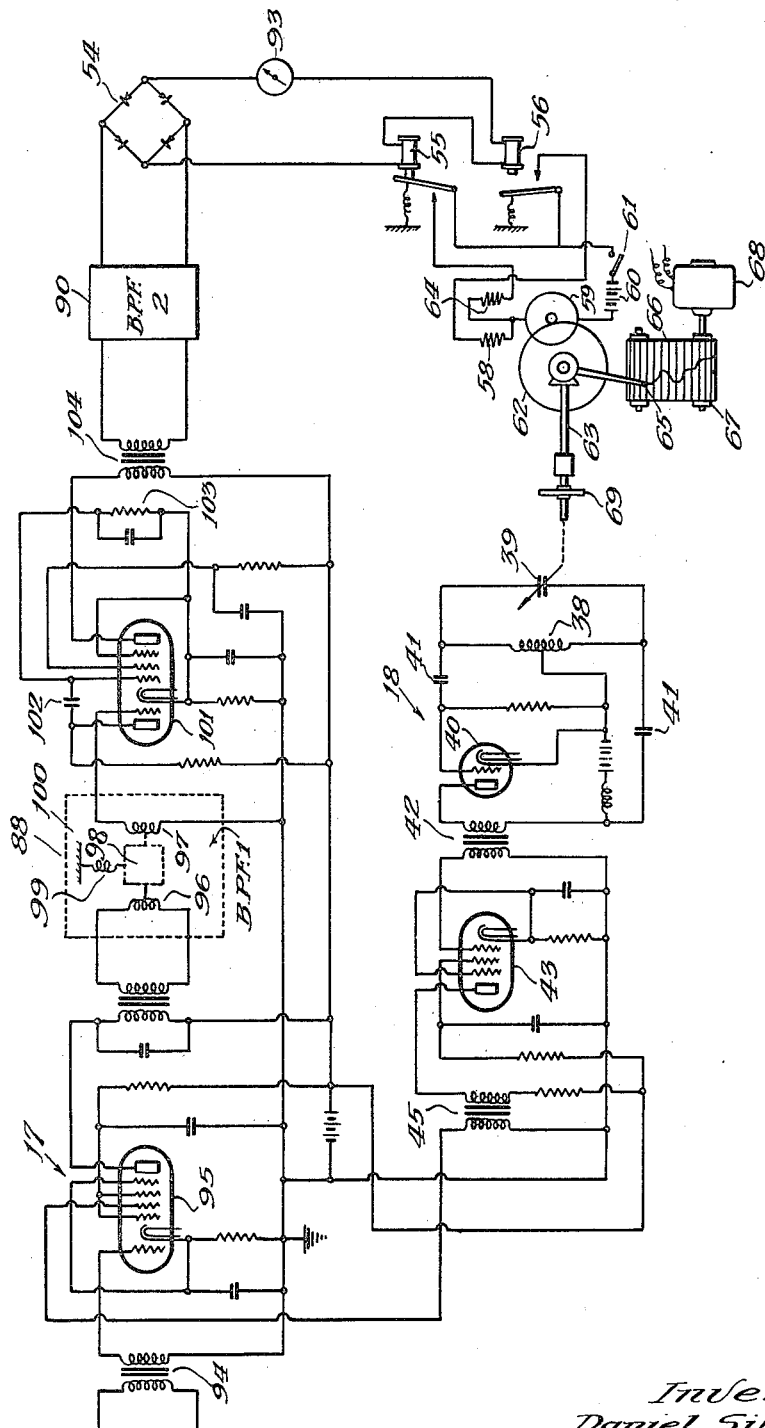

Apparatus suitable for carrying out the functions shown in Figure 5 are found in the diagram of Figure 7. Here the input from the transmission medium is applied to transformer 94 by means of which it is applied to the first grid of the pentagrid mixer tube 95. The output from the variable frequency oscillator 18 is applied through transformer 42 to an amplifier tube 43. The output of this amplifier is applied through transformer 45 to the third grid of the mixer tube 95. The output of the mixer tube which with its circuits comprises the heterodyne detector or modulator 17, is applied to a first low frequency sharply tuned band pass filter 88 which, as shown, is of the electro-mechanical type. This consists of two coils 96 and 97 which are insulated from but rigidly mounted on a mass 98 elastically suspended by suspension 99 from a case 100. Each of these coils is separately mounted to cut the flux of a magnetic field (not shown). The output of the heterodyne detector or modulator 17 drives the mass 98 by means of coil 96 at a frequency determined by the resonance of the mass and elastic suspension. This in turn vibrates coil 97 in its magnetic field generating voltage in proportion to its motion. By this means a very sharp low frequency band pass filter can be obtained. The output from this second coil 97 is amplified through a triode section of triode-pentode tube 101. The signal on the plate of the triode section of this tube is coupled by condenser 102 to the control grid of the pentode section of the tube which is connected to the cathode through a resistor-condenser combination 103. This resistor is a grid leak which operates to keep the output volume from the pentode section of this tube substantially constant in exactly the same manner discussed in connection with the operation of vacuum tube 46 in Figure 2. The output from the pentode plate is coupled through a transformer 104 to a second low frequency sharply tuned band pass filter 90 which may, for example, be of the same type as that shown for the first band pass filter 88. As previously discussed, the tuned frequency of this filter is slightly different from that of the first band pass filter 88. Since the voltage applied through transformer 104 is of substantially constant amplitude, the variation in the output from this filter 90 varies only in accordance with the frequency. The output of this filter is applied to a servo-mechanism which may, for example, be exactly the same as that shown in connection with Figure 2 including a rectifier 54, two relays 55 and 56 and an indicator 93. The two relays actuate the driving motor 59 by means of battery 60, switch 61 and field coils 58 and 64. This motor drives shaft 63 through a gear train 62 and simultaneously drives a stylus 65 which is recording on a strip or chart 66 rolled on a drum 67 by an electric motor 68. The motion of shaft 63 rotates the variable plates of condenser 39, thus changing the frequency of oscillator 18 and adjusting this frequency until the difference frequency between the input signal and those from oscillator 18 are at the predetermined difference determined by the first band pass filter 88. It should be added that filter 90 is adjusted so that its peak frequency is sufficiently different from that of the first band pass filter 88 so that the variation in amplitude of the output is approximately linear in the neighborhood of the frequency $f_0$. A second variant of the apparatus shown in block diagram form in Figure 5 is illustrated by Figure 8. The input signal from the frequency modulated source appears across the input transformer 94 and is impressed upon the control grid of the pentagrid mixer tube 95. As discussed below the third grid of this tube is actuated from the variable frequency oscillator so that the electron stream in the tube is first modified by the received signal and then further varied by the oscillator potential. The signal output from this tube which includes an alternating current component at the difference in frequency of these two waves is applied across the primary of transformer 105 which is preferably shunted by a condenser 106 which bypasses high frequency components of the output of the modulated signal. The output from transformer 105 is sharply filtered at a low frequency by band pass filter 88 which produces an output across transformer 106. The output from this transformer is brought to a uniform level, for example, by the amplitude control 89 which in this embodiment of the invention is shown as a limiter tube 107 with a grounded cathode and a grid circuit containing a grid leak 108. The tube is operated with low plate and screen grid voltages which in combination with the grid leak produces a bias which varies directly with the strength of the input signals, thus giving an output of substantially constant magnitude. Two or more of such limiters may be used in cascade if the amplitude is to be held to extremely close limits. The output from this limiter is impressed on a sharply tuned frequency discriminator which acts in the same fashion as does the band pass filter 90 shown in Figure 5, i. e., the output from this discriminator varies approximately linearly with the variation in frequency of the constant amplitude signals in the amplitude control 89. The signals from the limiter are applied to transformer 109, the secondary of which is tuned by condenser 110 to the desired low frequency. The signal is likewise capacitively coupled by condenser 111 and resistor 112 to the center tap on the secondary of the tuned transformer. The resultant signal on each half of the circuit is applied through a diode rectifier 113 across a resistor 114 across which are shunted bypass condensers 115. Briefly when the frequency of the constant amplitude signals applied to transformer 109 is at the desired frequency difference to which the secondary is tuned, no signal appears between the cathodes of the two tubes, but when the frequency varies from this value a D. C. voltage does appear, the magnitude of which varies with the divergence of the applied frequency from the tuned frequency. For a more complete description of this phenomenon reference is made to "Fundamentals of Vacuum Tubes," by A. V. Eastman, second edition, McGraw-Hill Book Company, 1941, pages 537 to 540. The variation in voltage between cathodes of the diodes 113 is read on the indicator 93 which is preferably a vacuum tube voltmeter of conventional design with high input resistance. This varying signal is likewise applied to the control grid of a so-called reactance tube 116 which is connected in the resonant circuit of the vacuum tube oscillator 18.

The cathode of vacuum tube 116 is effectively connected to the lower point of the inductance 117 which with condenser 118 forms a resonant circuit for oscillator tube 119. The plate is directly coupled to the other end of this inductance. The signal across this inductance is applied across a phase shifting network made up of resistor 120 and condenser 121, and the voltage across the resistor is applied to the control grid of tube 116. Since this grid effectively controls the amount of plate current regardless of the variation in plate potential, it follows that since this grid potential is approximately 90° out of phase with the plate potential that the plate current will be similarly 90° out of phase with the plate current so that the vacuum tube 116 will act as a reactance shunted across inductance 117. The value of this reactance is governed by the gain of the tube, which is determined by the bias between control grid and cathode of this tube. This bias is governed by the voltage between the cathodes of the discriminator of the diodes 113. Hence whenever the frequency applied to transformer 109 deviates from the value at which there is zero voltage between cathodes of diode 113 the effective reactance of the reactance tube 116 is altered, thereby changing the frequency of the oscillator tube 119. The frequency of this oscillator is varied in such a direction as to correct for the variation in difference frequency applied to transformer 109. The output from the oscillator 119 is preferably but not necessarily adjusted to a constant amplitude by passing the signal through a limiter tube 122 which has a grounded cathode and a grid leak resistor 123. The plate and screen grid of this tube are operated at a low potential through dropping resistor 124. The limited output from this stage is applied through transformer 125 to the third grid of the mixer tube 95 to complete the control action.

A recorder 92 which is preferably an electron tube type frequency meter of any of the well known types is connected across the secondary of the transformer 125. It thereby indicates the frequency from oscillator 18 which by the control system described herein is maintained at a predetermined constant difference in frequency from the input alternating current signal applied to transformer 94.

It is apparent that the invention described herein is capable of wide application and that the various embodiments which have been shown and described are but specific examples of which many others will be apparent to those skilled in the art. There is no intention of limiting the invention to the apparatus described; it is best set forth in the appended claim.

I claim:

In a system for demodulating frequency-modulated signals received in the presence of a very large noise background, the frequency of said signals being varied slowly in accordance with slowly changing transmitted intelligence, the combination comprising: receiving means for said frequency-modulated signals together with said noise, an oscillator containing at least one adjustable reactance and adapted to generate alternating potentials over approximately the same frequency range as the received signals, a modulator connected to said receiving means and to said oscillator, a first sharply tuned band-pass filter connected across the output of said modulator, said filter being tuned to frequency not greater than 100 cycles per second, means for maintaining the output of said filter at an approximately constant average amplitude, a second sharply tuned band-pass filter directly connected to the output of said amplitude-maintaining means and tuned to a frequency differing from but within the pass band of said first filter, and a servo-mechanism controlled only by the amplitude of the output of said second filter and adapted to vary the value of said adjustable reactance as the average amplitude of said second filter output varies from a fixed predetermined value, whereby said second filter output is maintained approximately constant and the frequency of said oscillator is maintained at a constant frequency difference from that of said signals.

DANIEL SILVERMAN.

REFERENCES CITED

The following references are of record in the file of this patent:

UNITED STATES PATENTS

| Number | Name | Date |
|---|---|---|
| 1,999,215 | Smith | Apr. 30, 1935 |
| 2,041,855 | Ohl | Mar. 26, 1936 |
| 2,112,826 | Cook | Apr. 5, 1938 |
| 2,121,103 | Seeley | June 21, 1938 |
| 2,126,910 | Moselly | Aug. 16, 1938 |
| 2,165,510 | Rosene | July 11, 1939 |
| 2,192,022 | Wills | Feb. 27, 1940 |
| 2,233,198 | Dome | Feb. 25, 1941 |
| 2,245,685 | Koch | June 17, 1941 |
| 2,379,689 | Crosby | July 3, 1945 |
| 2,380,947 | Crosby | Aug. 7, 1945 |
| 2,396,360 | Ziegler | Mar. 12, 1946 |